Sept 10, 1957 E. DONATH 2,806,205
CENTER FINDER
Filed Dec. 9, 1953 2 Sheets-Sheet 1
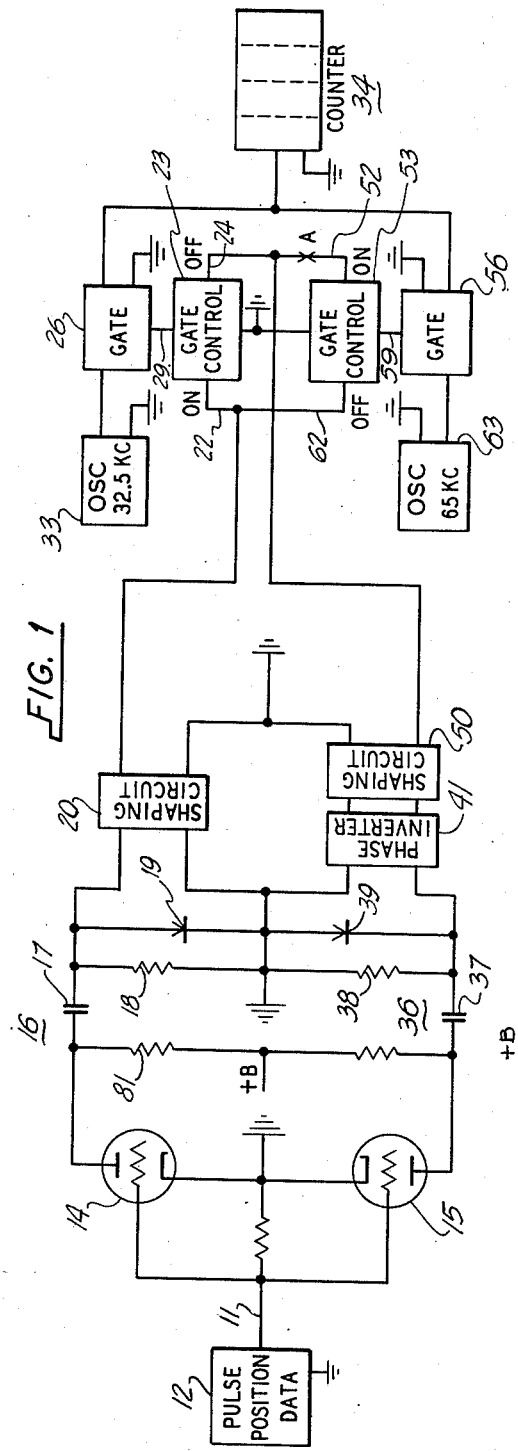
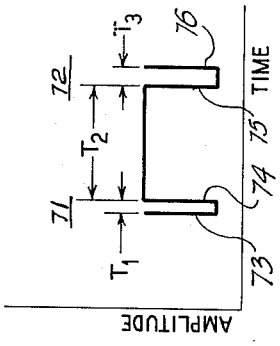
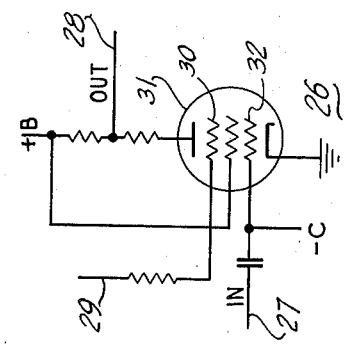
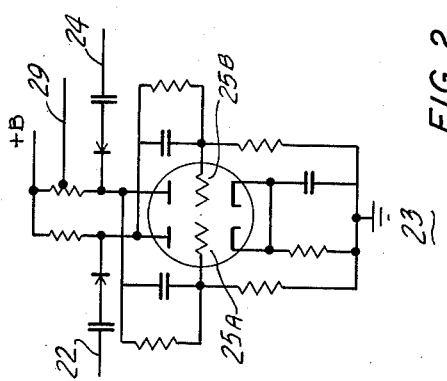
*INVENTOR.*
ERWIN DONATH
BY Ralph K. Bonell
*AGENT*

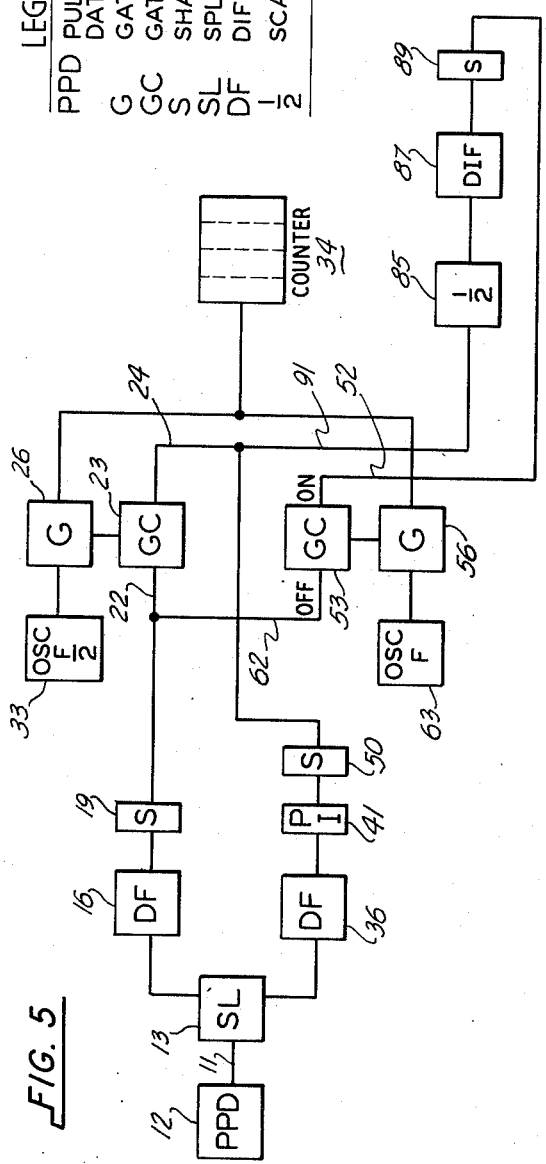
FIG. 5
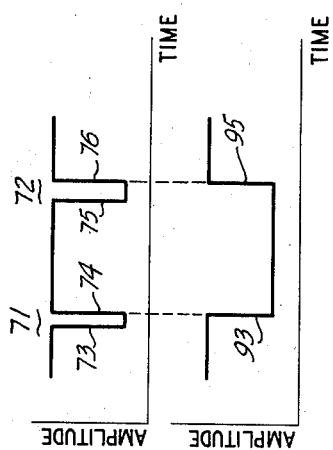
FIG. 6A
FIG. 6B
INVENTOR.
ERWIN DONATH
BY Ralph K. Bonell
AGENT

United States Patent Office 2,806,205
Patented Sept. 10, 1957

2,806,205

CENTER FINDER

Erwin Donath, Princeton, N. J., assignor to Applied Science Corporation of Princeton, Princeton, N. J., a corporation of New Jersey Application December 9, 1953, Serial No. 397,188

8 Claims. (Cl. 324—68)

This invention relates, generally, to electrical computing and data processing apparatus and it refers more particularly to means for obtaining a measure of the time interval between the occurrences of a pair of spaced electrical impulses employed therein to convey numerical information.

In computers and similar apparatus wherein values of the processed data are represented by selected characteristics of electrical waves or impulses, different forms of data representation may be adopted for different portions of the operating cycle, thereby requiring the provision of means for converting from one form to another. Where a conversion is made from pulse-position data to a digital form of representation means are required for precisely measuring the interval between the occurrences of paired spaced impulses, usually narrow impulses of substantially rectangular form, in terms of the count of a sequence of other impulses. Difficulties and ambiguity may occur in this type of measurement because of uncontrollable variations in the duration of the individual impulses of a spaced pair, that is, variations in width along the time axis.

In some computing apparatus the spacing of either the leading or trailing edges is used as a measure of the spacing of the paired impulses themselves, often because of the ease of recognizing the positions of these portions of the waveforms. Unless edge positions are of governing significance however, a more suitable criterion in many applications is the center-to-center spacing, which approximates the spacing of ideal impulses of infinitesimal width. In the past, however, simple and convenient means have been lacking for obtaining an electrical measure of center-to-center spacing, particularly in digital form.

The circuit means of the present invention measures center-to-center spacing as the sum of three terms representing, respectively, the half-widths of the two impulses of a pair and the distance between the trailing edge of the first impulse and the leading edge of the second impulse, all measurements being in digital form. Effective measures of the respective half-widths of the impulses are obtained by actual measurement of the whole widths in terms of a time unit having twice the value of the unit used in expressing the value of the remaining term of the sum, the number of units counted being thereby divided by two.

Pulse-position data, wherein numerical values are represented by pulse spacing, may originate in various modulation processes. For example, in the co-pending application of the present inventor, joint with John F. Brinster, for "Plotter," Serial No. 377,092, filed Aug. 28, 1953, assigned to the assignees of the present invention, there is disclosed photo-electric means for scanning at a uniform rate across a trace of recorded values of variable data and a reference trace therefor, to obtain successive measures of the variable spacing of said two traces. The resulting output for each scanning operation is a pair of electrical impulses respectively corresponding in width to the widths of the two traces and spaced in time in accordance with the linear spacing thereof, and hence proportional to a single value of the data. Graphical data are thus converted into pulse position data. The precision with which this conversion is carried out is affected by the widths of the two traces, in the direction of scan, and these may vary appreciably and independently of one another from point to point along the graph, due to various causes related to the recording process. In such an application, the present invention, by providing a measure of the center-to-center spacing of the impulses resulting from the scanning of the graph, effectively measures the center-to-center spacing of the traces themselves, thereby minimizing errors of measurement due to variation of trace width.

It is an object of the present invention to provide simple and readily operable circuit means for obtaining an electrical measure of the center-to-center spacing, along the time axis, of a pair of electrical impulses.

Another object is to provide means for obtaining a measure of the spacing of a pair of electrical impulses of substantially rectangular wave form and of relatively short duration in terms of the count of a sequence of other impulses.

Another object is to provide a method of and means for the precise conversion of pulse-position data to digital form.

Another object is to provide means for converting graphical data to digital form, with intermediate conversion to pulse-position data.

Further objects and advantages of the invention will be apparent upon consideration of the following specification, taken in connection with the appended drawings in which:

Fig. 1 is a circuit diagram, partially in block form, of one embodiment of the invention.

Fig. 2 is a circuit diagram of an electronic gate control.

Fig. 3 is a circuit diagram of an electronic gate.

Fig. 4 is a chart of wave forms related to the circuit of Fig. 1, for purposes of explanation.

Fig. 5 is a circuit diagram, in block form, showing a modification of the circuit of Fig. 1.

Figs. 6A and 6B are charts of waveforms related to the circuit of Fig. 5.

Referring now, to Fig. 1, there is shown an input lead 11 adapted to receive pulse-position data impulses from a source 12 thereof and to apply them to a splitting circuit 13 comprising triodes 14 and 15 having the respective grids thereof both connected to lead 11. The output of triode 14 is connected to a differentiating circuit 16 comprising series capacitor 17 and shunt resistor 18, the latter paralled by a rectifier 19 constituting an effective short circuit across the resistor for waves of one polarity and presenting a high shunt impedance to waves of opposite polarity. Depending upon the output waveform of circuit 16, various wave-shaping circuits may be employed to effect minor modifications of the shape thereof, for example, clipping circuits and other means well known in the art, indicated in block form by shaping circuit 20. The output of circuit 20 is applied by way of "on" lead 22 to gate control 23, having corresponding "off" lead 24, to actuate gate 26. Gate control 23 (Fig. 2) is a bistable circuit of known configuration in which conduction alternates between triodes 25A and 25B responsive to negative trigger impulses applied in alternating sequence to leads 22 and 24. Gate 26 (Fig. 3), comprising pentode 31, is open for transmission between "in" lead 27 and "out" lead 28 when triode 25A of gate control 23 conducts and triode 25B is cut-off, The positive potential then applied by way of lead 29 to grid 30 overcomes the effect of a negative potential on grid 32 normally biasing the tube to cut-off. When open, gate 26 permits the transmission of impulses from a source of uniformly-spaced impulses, illustrated as oscillator 33, to counter 34, both of which components may be of conventional design. An operating frequency of 32.5 kc. is shown for oscillator 33, by way of example. A particular form of counter which has, in practice been used in the circuit of the present invention in the location of counter 34, is described in the co-pending application of Brinster, Hill and Donath, entitled "Method of and Circuit for Counting Impulses," Serial No. 321,704, filed November 20, 1952, assigned to the assignees of the present invention.

That portion of the described upper half of the bifurcated circuit of Fig. 1 which comprises circuits 16 and 20 constitutes a detector of the leading edge of an input data-impulse, as will be explained in connection with the description of the operation thereof. The generally similar lower half of the circuit includes means for detecting the occurrence of the trailing edge of such an impulse and comprises, in addition to triode 15 of splitting circuit 13, previously referred to, differentiating circuit 36, corresponding to circuit 16 and having series capacitor 37, shunt resistor 38 and rectifier 39. Rectifiers 19 and 39 are oppositely polarized with respect to the common circuit ground and a phase inverter 41 follows rectifier 39, to obtain outputs of the same polarity from the two detector circuits. The output of circuit 41, modified by shaping circuit 50 is applied by way of "on" lead 52 to gate control 53, having "off" lead 62. Gate control 53, similar to gate control 23, governs the operation of gate 56, similar to gate 26, by means of the potential applied to lead 59, in the manner previously described in connection with gate 26. The opening of gate 56 permits oscillations or impulses from oscillator 63 to reach counter 34 for registration thereby. The operating frequency of oscillator 63 is shown as 65 kc., twice that of oscillator 23. The "off" lead 62 of gate control 53 is connected to "on" lead 22 of gate control 23 and "on" lead 64 of gate control 53 is connected to "off" lead 24 of gate control 23, to the end that gates 26 and 56 may be simultaneously operated in opposite manner.

The operation of the described circuit of Fig. 1 is as follows: In the measurement of the spacing of a pair of impulses, such as negative impulses 71 and 72 of Fig. 4, assuming as a start the occurrence of the first leading edge to appear on lead 11, edge 73 of impulse 71, this edge causes a varying voltage output to appear across load resistor 81 in the plate circuit of triode 14 which, when differentiated by circuit 16, results in a sharply peaked negative impulse, shaped by circuit 20 to provide an output of suitable form to trigger a gate control. Rectifier 19 presents a high shunt impedance to negative impulses and hence its attenuating effect thereto is negligible. The transmission of an impulse derived from leading edge 73 through the lower half of the circuit, particularly beyond differentiating circuit 36, is prevented by rectifier 39 which effectively short-circuits the transmission path for such an impulse.

Assuming gate control 23 to have existed, initially, in a condition that held gate 26 closed, the application of the described negative trigger to "on" lead 22 reverses this operating condition and opens gate 26. Oscillations or uniformly-spaced impulses then pass from oscillator 33 to counter 34 at the rate of 32,500 a second. These, as well as impulses in other parts of the circuit, may be shaped by known means, not shown.

The trailing edge 74 of impulse 71 causes a sharp positive impulse to appear at the output of differentiating circuit 36. In this case rectifier 39 presents a high shunt impedance to the wave and so has relatively little attenuating effect, whereas transmission of such an impulse through the upper half of the circuit is effectively blocked by the short-circuiting effect of rectifier 19. The positive impulse at the output of circuit 37 becomes a negative impulse after inversion by phase-inverting circuit 41 and is shaped by circuit 50 and applied to lead 24, the "off" lead of gate control 23, causing this gate control to close gate 26. The count of impulses supplied to counter 34 from oscillator 33, at the rate of 32,500 a second, during the foregoing phase of operation is 32,500 $T_1$, where $T_1$ is the width (Fig. 4) of impulse 71 along the time axis, in seconds.

At the instant that a trigger impulse on lead 24 causes the closing of gate 26 the same impulse applied to lead 52, the "on" lead of gate control 53 in the circuit of Fig. 1, causes the opening of gate 56 and starts a flow of oscillations or impulses from oscillator 63 to counter 34 at the rate of 65,000 a second. This flow continues until the leading edge 75 of input impulse 72, in the manner previously described in connection with leading edge 73, causes the appearance of a trigger impulse on lead 62 which actuates gate control 53 to close gate 56. During the open period of gate 56 the count of impulses supplied to counter 34 is 65,000 $T_2$, where $T_2$ is the time interval, in seconds, between the occurrences of trailing edge 74 and leading edge 75.

At the instant gate 56 is closed by an impulse derived from leading edge 75, gate 26 is again opened, through the operation of gate control 23 by the same impulse, and remains open until trailing edge 76 develops a trigger impulse on lead 24 causing gate control 23 to shut gate 26, thus completing the measuring operation. During the interval between the appearance on lead 11 of limiting edges 75 and 76 of input impulse 72 there is supplied to counter 34 from oscillator 33 a sequence of impulses having a count of 32,500 $T_3$, where $T_3$ is the duration of said interval.

As a result of the selected two-to-one relationship between the frequencies of oscillators 63 and 33, the unit employed in measuring the intervals $T_1$ and $T_3$, that is, the period of one cycle at 32.5 kc. has twice the value of the unit employed in measuring the interval $T_2$, the period of one cycle at 65 kc. The counts of impulses registered by counter 34 during $T_1$ and $T_3$ are, therefore, respectively half of the counts that would have been registered at 65 kc. and thus measure the half-widths of impulses 71 and 72, in terms of impulses occurring at 65 kc.

The impulses successively applied to counter 34 are summed thereby, the total count registered between the appearances on lead 11 of leading edge 73 and trailing edge 76 of input impulses 71 and 72, respectively, being, $$32,500T_1 + 65,000T_2 + 32,500T_3$$

or $$65,000\left(T_2 + \frac{T_1}{2} + \frac{T_3}{2}\right)$$

which is the measure, in digital form, of the center-to-center spacing of paired impulses 71 and 72, in terms of impulses occurring at a frequency of 65 kc.

In the foregoing description of the operation of the circuit of Fig. 1, the starting and stopping of the measuring operation have been assumed to correspond to the occurrences of leading edge 73 and trailing edge 76, respectively, which may be effected by the use of gating or other controls, not shown. A slightly different method of operation not subject to the above limitation is provided for by the circuit of Fig. 5. The departure of this circuit from that of Fig. 1 is at the point marked "A" where there are inserted in lead 52 of Fig. 1 serially connected scaler 85, differentiating circuit 87 and shaper 89. Scaler 85 is a 'scale of two' circuit of known design alternately operated to its two stable states by successive negative trigger input impulses applied to lead 91. Such circuits are described, for example, in the book "Electronics" by Elmore and Sands. Circuit 87 is similar to circuits 16 and 36. The relationship of significant waveforms occurring during the operation of the circuit of Fig. 5 is shown in Figs. 6A and 6B, the former corresponding, generally, to Fig. 4 and the latter showing the output of scaler 85.

Assuming both gates 26 and 56 to be closed at the start of operations responsive to the termination of a preceding measurement, as later referred to, leading edge 73 opens gate 26 and trailing edge 74 closes said gate in described manner. The closing impulse applied to "off" lead 24, however, is not directly applied to "on" lead 52 of gate control 53, as in the circuit of Fig. 1, but instead is applied by way of lead 91 to scaler 85, which, though previous cycling, is in a state causing said impulse to produce a drop in the output voltage thereof, shown in Fig. 6B as leading edge 93. Differentiating and shaping by circuits 87 and 89, respectively, result in an impulse being developed which then applied to lead 52, opens gate 56, through the operation of gate control 53. No significant time delay occurs through the operation of the described additional elements.

Gate 26 is again opened upon the occurrence of leading edge 75 and gate 56 simultaneously closed. An impulse derived from trailing edge 76 applied to lead 24 closes gate 26, through the operation of gate control 23. Gate 56 is not re-opened at this time, however, since trailing edge 95 of the output wave of scaler 85 does not produce an output from differentiating circuit 87 if the rectifier therein is polarized to pass an impulse resulting from leading edge 93, as has been above assumed. This property of selectively passing a wave of one polarity, resulting from the differentiation of an input, has been previously referred to in connection with circuit 16. No impulses from oscillator 63, therefore, reach counter 34 after the termination of the measuring period nor until the occurrence of the first trailing edge of a data impulse in the next measuring period. A sequence of pulse-position data may thus be converted to digital form for alternate storage by and read out from a counter, or for utilization by other means.

The embodiments of the invention described herein are by way of example and not by way of limitation. The limits of the invention are defined in the appended claims.

I claim:

1. In data processing apparatus wherein numerical values are represented by the time spacing of paired electrical impulses of finite duration means for obtaining a measure of the center-to-center spacing of a pair of said impulses comprising in combination first means controlled by said impulses for obtaining measures of the respective durations of the impulses of said pair in terms of a first unit having a first time value, second means controlled by said impulses for obtaining a measure of the interval between the termination of the first of said impulses and the beginning of the second thereof in terms of a second unit having a second time value, and third means connected to said first and second means for additively combining said several measures, said first unit having a time value twice said second unit.

2. In a circuit for converting pulse-position data to digital form the combination of a source of pulse-position data, a leading edge and a trailing edge detector connected to said source and each supplying an output upon actuation thereof, a pair of oscillators having operating frequencies in two-to-one ratio, a counter operable both to count and sum impulses individually received therefrom, and circuit means connected to said detectors and controlled thereby and connected to said sources and said counter for controlling the flow of said impulses in accordance with the outputs of said detectors, said leading edge output initiating a flow of impulses from said low-frequency oscillator to said counter and terminating a flow from said high-frequency oscillator thereto and said trailing edge output initiating a flow from said high-frequency oscillator and terminating a flow from said low-frequency oscillator.

3. In a circuit for converting pulse-position data to digital form the combination of a source of pulse-position data, a leading edge and a trailing edge detector connected thereto each supplying an output upon actuation thereof, a pair of oscillators having operating frequencies in two-to-one ratio, a counter connected to both to count and sum impulses individually received therefrom, and circuit means including a two-to-one scaling circuit for controlling the flow of said impulses in accordance with said outputs, said leading edge output initiating a flow of impulses from said low-frequency oscillator to said counter and terminating a flow from said high-frequency oscillator thereto and said trailing edge output initiating a flow from said high-frequency oscillator and upon alternate occurrences thereof actuating said scaling circuit to produce an output terminating a flow from said low-frequency oscillator.

4. In a circuit for converting pulse-position data to digital form the combination of means supplying paired spaced impulses of variable spacing, a circuit having two branches connected to said means for supplying outputs from one said branch at times corresponding to the leading edges of said impulses and for supplying outputs from the other said branch at times corresponding to the trailing edges of said impulses, each branch comprising differentiating means and a shunt rectifier, said rectifiers being oppositely polarized and one of said branches including a phase inverter, a pair of sources of uniformly spaced impulses having a two-to-one frequency relationship, an output circuit for receiving and summing impulses from said sources, and means connected to said branches and controlled by said outputs and connected between said sources and said output circuit for controlling the individual inputs received by said output circuit in accordance with the respective outputs of said branch circuits.

5. In data processing apparatus wherein numerical values are represented by the time spacing of paired electrical impulses of finite duration, means for obtaining a measure of the center-to-center spacing of a pair of said impulses comprising in combination first means controlled by said impulses for producing first signals having time values related to the respective durations of the impulses of said pair, second means controlled by said impulses for producing a second signal having a time value related to the interval between the termination of the first of said impulses and the beginning of the second thereof, and means connected to said first and second means for additively combining said signals, said first signals having a time value greater than the time value of said second signal.

6. Means for measuring the spacing between pairs of spaced pulses comprising a first source of impulses of a first frequency, a second source of impulses of a second frequency, means for counting said impulses, means controlled by said pairs of pulses for connecting said first source to said counter for the durations of a pair of said pulses and for alternately connecting said second source to said counter for the interval between said pair of pulses.

7. Means according to claim 6 wherein said second frequency is substantially equal to twice said first frequency.

8. Means for measuring the spacing between pairs of spaced pulses comprising a first source of impulses of a first frequency, second source of impulses of a second frequency higher than said first frequency, means for counting said impulses, first means controlled by said pairs of pulses for providing first pulses corresponding to the leading edges of said pairs of pulses, second means controlled by said pairs of pulses for providing second pulses corresponding to the trailing edges of said pairs of pulses; gating means connected between said first and second sources and said counting means and controlled by said fisrt and said second pulses for supplying impulses from said first source to said counting means for the durations of said pairs of pulses and for supplying impulses from said second source to said counting means for the intervals between the pulses of said pairs of pulses, and further means controlled by said pulses for preventing the counting of said impulses during the intervals between said pairs of pulses.

References Cited in the file of this patent

UNITED STATES PATENTS

| | | |
|---|---|---|
| 2,433,385 | Miller | Dec. 30, 1947 |
| 2,603,715 | Vaughan | July 15, 1952 |
| 2,656,524 | Gridley et al. | Oct. 20, 1953 |